(12) United States Patent
Fremantle et al.

(10) Patent No.: US 7,689,430 B2
(45) Date of Patent: Mar. 30, 2010

(54) ACCESS TO WEB SERVICES

(75) Inventors: Paul Zachary Fremantle, Emsworth (GB); Simon Antony James Holdsworth, Andover (GB); William Arpad Nagy, New York, NY (US); Christopher Edward Sharp, Winchester (GB); Sanjiva Weerawarana, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1807 days.

(21) Appl. No.: 10/322,905

(22) Filed: Dec. 16, 2002

(65) Prior Publication Data

US 2004/0117199 A1 Jun. 17, 2004

(51) Int. Cl.
*G06Q 99/00* (2006.01)
(52) U.S. Cl. .......................................................... 705/1
(58) Field of Classification Search ...................... 705/1
See application file for complete search history.

(56) References Cited

U.S. PATENT DOCUMENTS 7,013,290 B2 * 3/2006 Ananian ...................... 705/27

2003/0061404 A1 * 3/2003 Atwal et al. ................. 709/328

OTHER PUBLICATIONS

Venkatapathy et al.; "An Introduction to Web Services Gateway", www.IBM.com/developerworks/webservices/library/ws-gateway/, May 1, 2002.*
Di Lena et al. (Di Lena, David; Phillips, James; "SoapSwitch Web Services Gateway: An Essential Infrastructure Component for Successful Enterprise Adoption of Web Services Technologies." Actional Corporation Whitepaper, Jan. 2002).*

* cited by examiner

*Primary Examiner*—Jonathan Ouellette
(74) *Attorney, Agent, or Firm*—Scully, Scott, Murphy & Presser, P.C.; Kenneth R. Corsello, Esq.

(57) ABSTRACT

The present invention provides a web service gateway which enables a web client to access a target service which does not provide a transport mechanism with which the client can communicate. The gateway imports a target service document describing the target service interface, end point addresses and supported transport mechanisms, and then modifies it by adding end point addresses and transport mechanisms supported by the gateway. A client may then access the target service by obtaining the modified document and sending a request to a gateway provided end point address using the associated transport mechanism. The gateway then forwards the request to the target service by converting the request and forwarding it to an end point address and transport mechanism specified in the target service document.

25 Claims, 6 Drawing Sheets

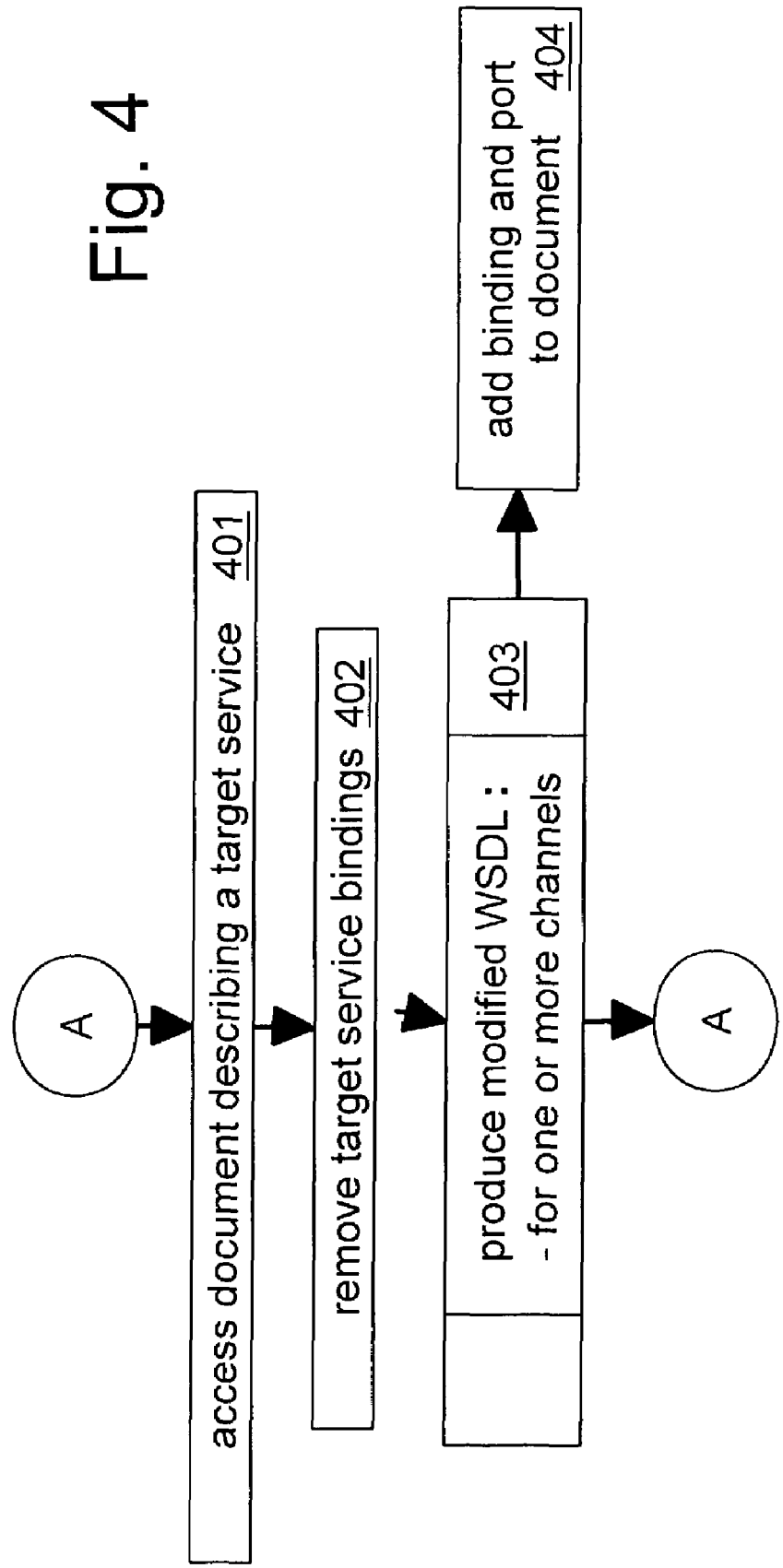

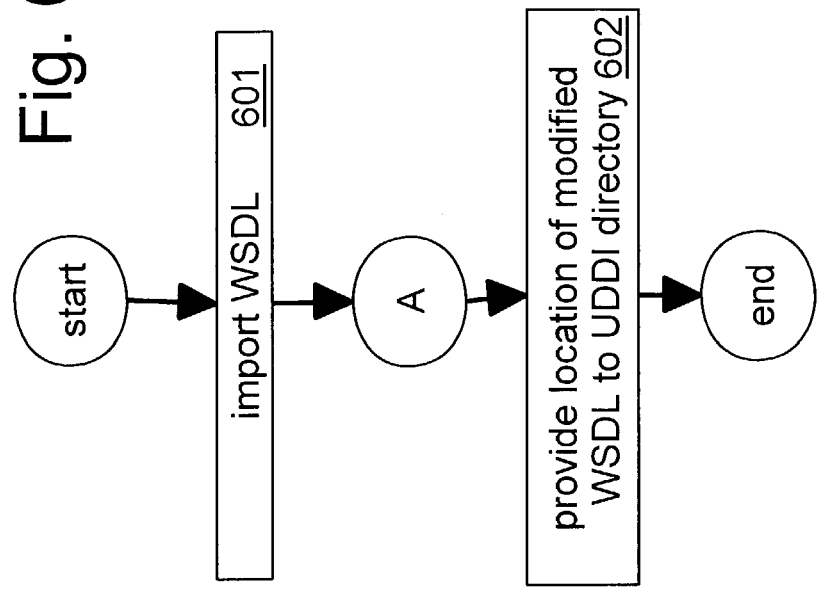
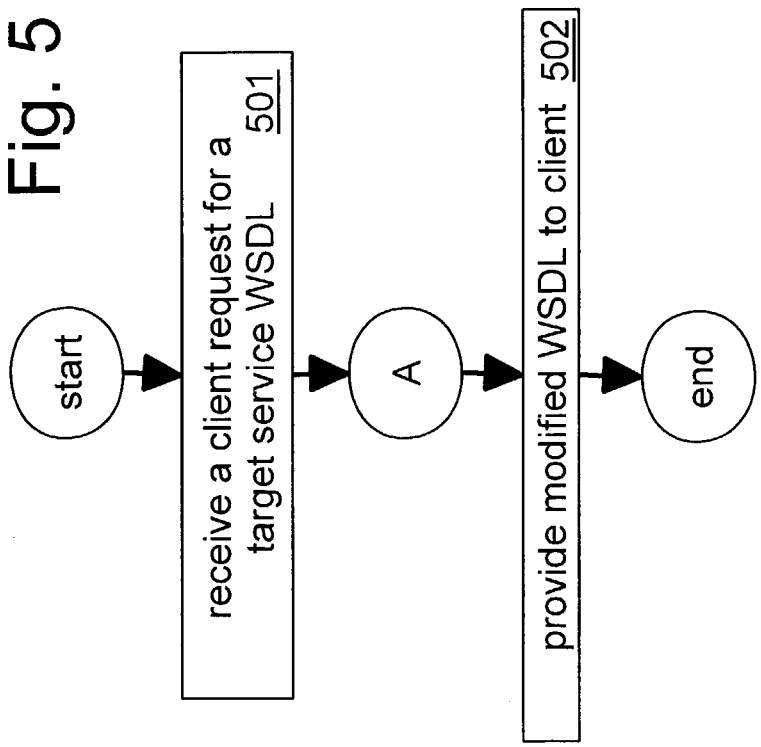

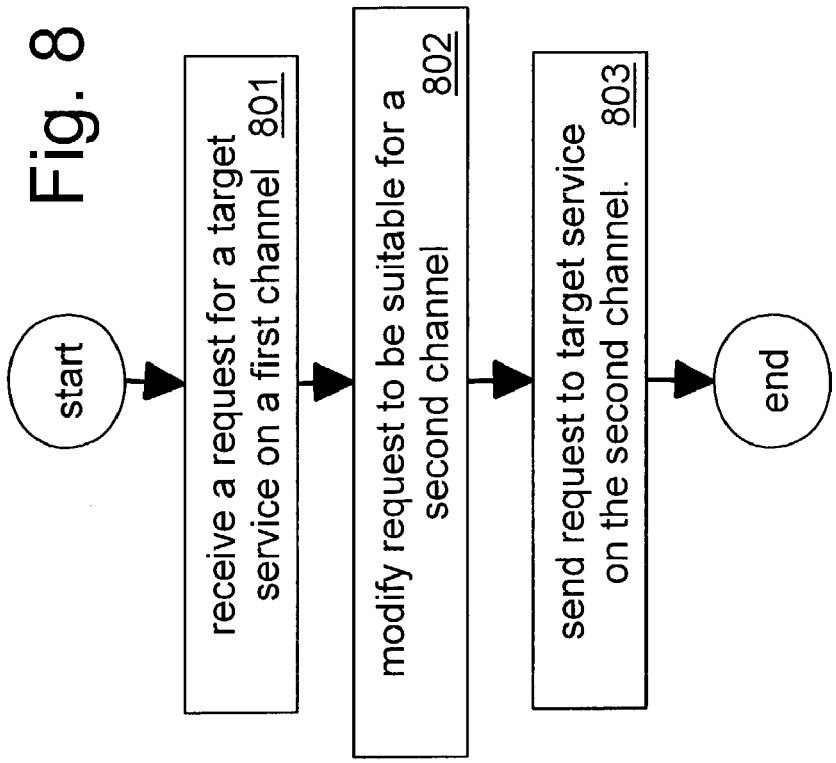
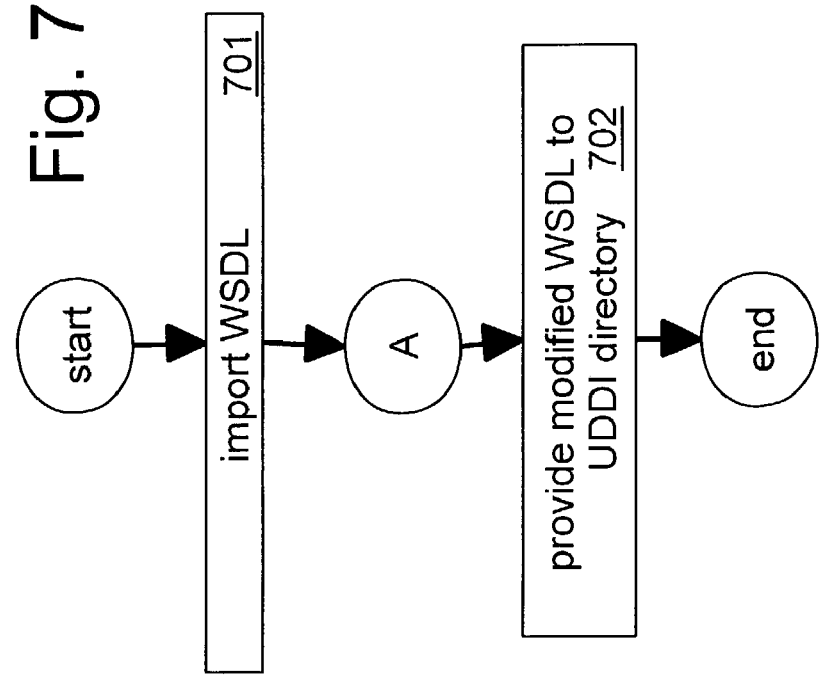

ACCESS TO WEB SERVICES

FIELD OF THE INVENTION

The present invention relates to provision of web services and more particularly to facilitating client access to such services.

BACKGROUND TO THE INVENTION

Over recent years it has become commonplace for a business to provide a web site on the Internet which, for example, enables a web client to purchase goods from the business over the world wide web. Following on from this success it has more recently become a requirement to handle more complex e-business applications on the Internet which, for example, enable business to business communication and this requirement has been satisfied by the arrival of Web services. Web services are modular and enhanced e-business applications that enable programmatic interaction between applications across the Internet. Based on shared, open, and emerging technology standards and protocols, such as SOAP (Simple Object Access Protocol), UDDI (Universal Description, Discovery and Integration), and WSDL (Web Service Definition Language), Web services can communicate, interact, and integrate with heterogeneous applications, irrespective of their implementation formats. Web services can interact with one another across the Internet to facilitate dynamic integration between businesses, suppliers, partners, and customers.

For example, a web service which provides an e-business application publishes its URL in a well known UDDI directory. A client can then obtain the URL from the UDDI registry and contact the e-business using the URL in order to obtain a WSDL document. The WSDL describes the interface provided for clients by the service e-business application, one or more transport mechanisms, for example SOAP over HTTP, (HyperText Transport Protocol) and an end point address for each transport mechanism. Once a client has the WSDL it can invoke the interface via the specified end point using the specified transport mechanism. Further if the client has a e-business application with which the service e-business application may wish to communicate the client and service may exchanges WSDL documents in order to make this possible.

However, a problem associated with this method of providing web services occurs when none of the transport mechanisms supported by a target service are supported by the client, as this makes it impossible for the client to communicate directly with the target service.

SUMMARY OF THE INVENTION

The present invention solves this problem by providing a gateway which acts as an intermediary between a client and a target service. The gateway publishes the interface of the target service but specifies transport mechanisms and corresponding end point addresses which are supported by the gateway thereby enabling the client to access the target service, via the gateway, using a transport mechanism at the end point address supported by the gateway.

Accordingly, according to a first aspect the present invention provides a method comprising: a gateway providing access to a target service, the gateway having a plurality of channels each of the channels providing access to the gateway at an end point address and using a transport mechanism, by including the steps; accessing a first document describing the target service, the first document including details of a transport mechanism and an end point address for accessing the target service; creating a modified document by adding details comprising the transport mechanism and the end point address of at least one of the plurality of channels to the first document; and making said modified document available to a client; thereby enabling the client to access the target service via the gateway using one of the channels for which details were added to the modified document.

According to a second aspect the present invention provides an apparatus comprising: a gateway means to provide access to a target service, the gateway apparatus comprising a plurality of channels each of the channels providing access to the gateway apparatus at an end point address and using a transport mechanism, the gateway including; means for accessing a first document describing the target service, the first document including details of a transport mechanism and an end point address for said target service; means for creating a modified document by adding details comprising the transport mechanism and end point address for at least one of the plurality of channels to the first document; and means for making the modified document available to a client; thereby enabling the client to access the target service via the gateway using one of the channels for which details were added to the modified document.

The document could be, for example in XML, but is preferably in WSDL. Transport mechanisms could be, for example, one or more of SOAP over HTTP, SOAP over JMS, RMI over IIOP, XML over JMS, and SOAP over SMTP. Note that the first document may contain a target service transport mechanism and end point address which if not removed from the modified document will enable the client to access the target service directly using the target service transport mechanism and end point address. However, optionally the details of the target service transport mechanism and end point address are removed from the modified document. In this case if the client uses the modified document made available by the gateway it can only obtain access to the target service via the gateway.

Note that the modified document can be made available to the client by publishing a location from which the modified document can be obtained, in a source available to the client. Such a location could, for example, be a servlet provided by the gateway. Such a source could, for example, be a UDDI directory. Alternatively the modified document can be published at the source available to the client.

If the modified document is made available to the client by publishing a location from which the modified can be obtained, optionally the modified document can be created when requested by a client. As a result the modified document provided to the client can contain new details of the target service and/or new transport mechanisms and associated end point addresses available in the gateway even if these have only become available since the location was published.

Note that there are various embodiments in which the gateway can access the first document. For example it could comprise obtaining the first document from a location contained in configuration information of the gateway. Such a location could be, for example, a UDDI directory. Alternatively, for example, the first document could be provided to the gateway by a data processing host, such as a data processing host in which the target service resides.

If the client elects to use a gateway provided channel to access the target service and the elected channel provides a transport mechanism which is different to any transport mechanisms provided by the target service the gateway should convert the received request to enable it to be sent using a transport mechanism supported by the target service as defined in the document provided by the target service.

BRIEF DESCRIPTION OF THE DRAWINGS

The invention will now be described, by way of example only, with reference to a preferred embodiment thereof, as illustrated in the accompanying drawings, in which:

FIG. 4 is a flow diagram of a method for a gateway to create a modified version of a target service WSDL document;

FIGS. 5, 6 and 7 are flow diagrams of different embodiment methods by which the gateway can use the method of FIG. 4; and FIG. 8 is a is a flow diagram of a gateway processing a client request for a target service.

Note that in the figures like numbers are used to denote like parts.

DESCRIPTION OF THE PREFERRED EMBODIMENT

Figure 1:
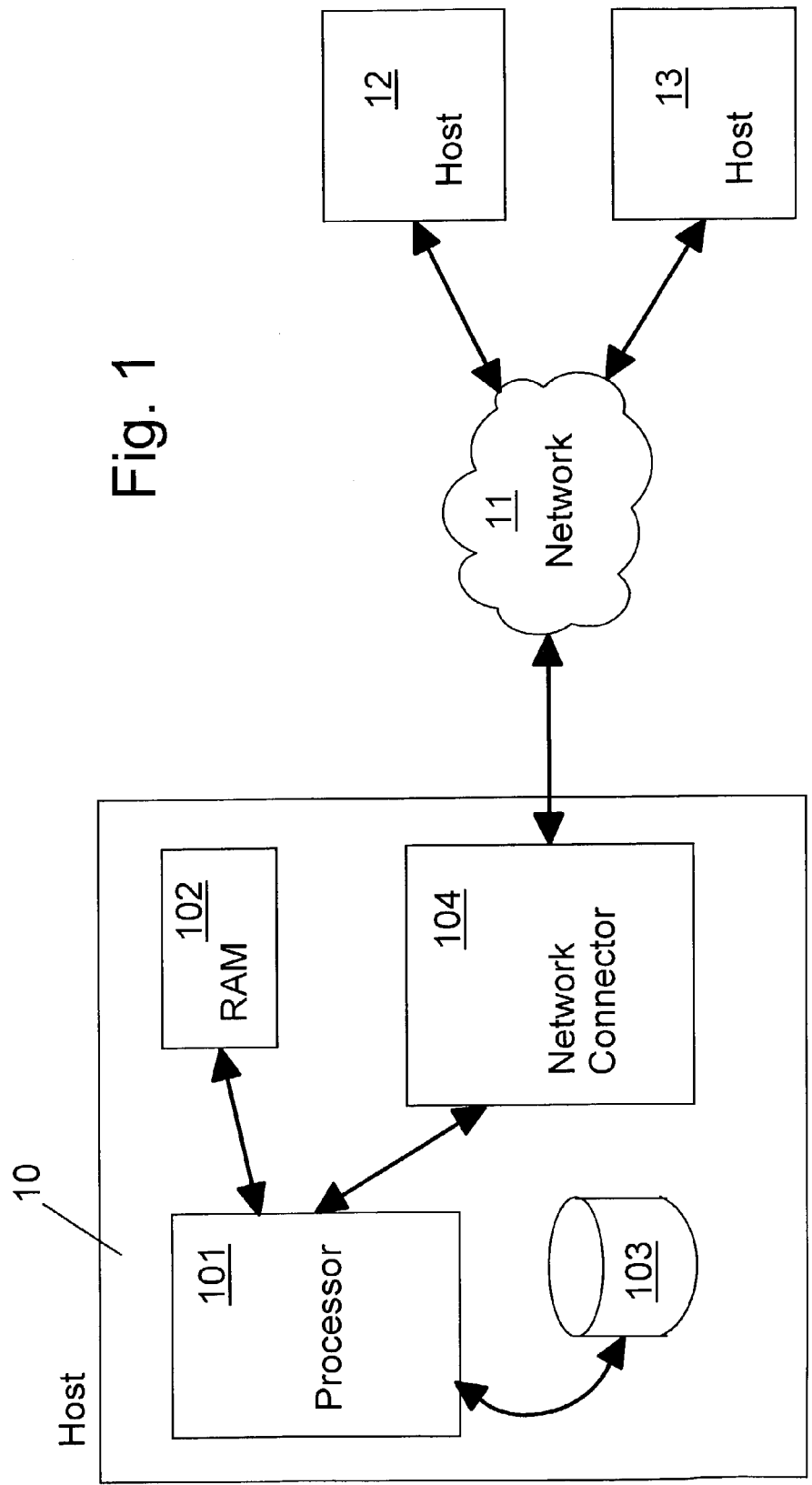
FIG. 1 is a schematic diagram of a data processing environment in which the preferred embodiment of the present invention can be advantageously applied.

FIG. 1 is a block diagram of a data processing environment in which the preferred embodiment of the present invention can be advantageously applied; In FIG. 1, a client/server data processing host 10 is connected to other client/server data processing host 12 and 13 via a network 11, which could be, for example, the Internet. For example a client program could be executing on host 10 which is accessing a target service on host 12 via a gateway server on host 13. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13.

Figure 2:
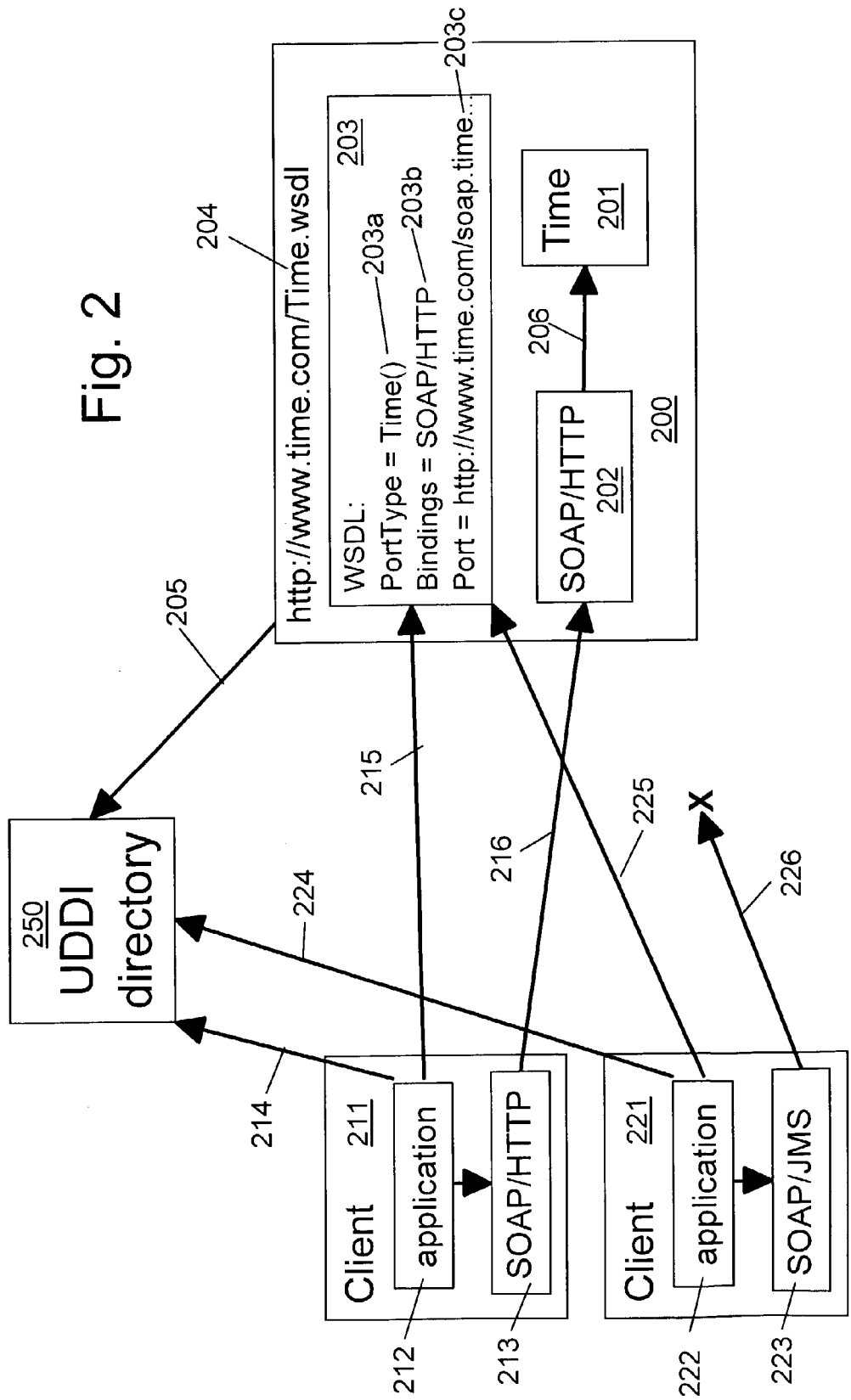
FIG. 2 is a schematic diagram of a client accessing a target service according to the prior art.
Figure 3:
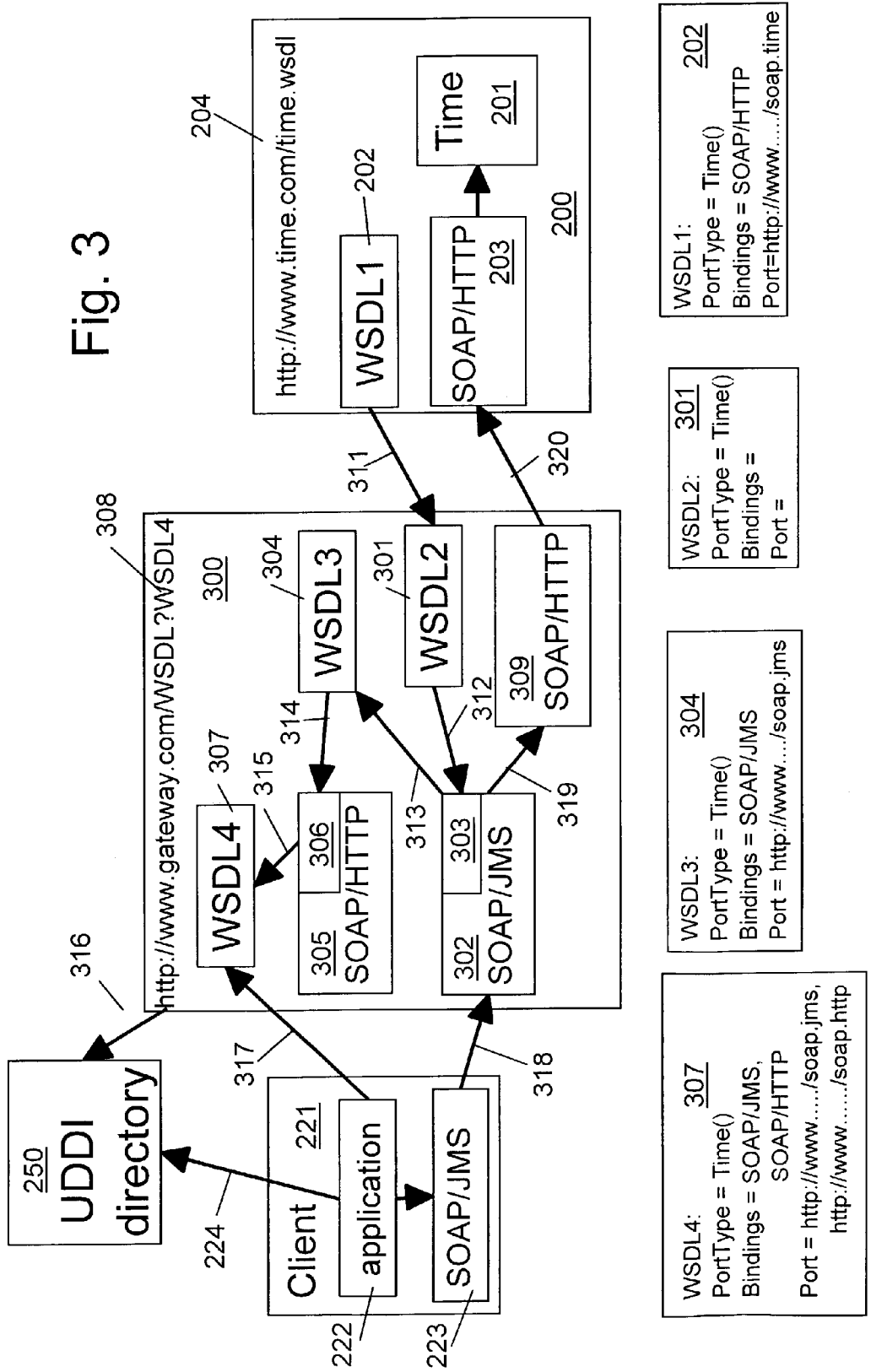
FIG. 3 is a schematic diagram of a client accessing a target service according to the preferred embodiment of the present invention.

FIGS. 2 and 3 are schematic diagrams which show examples of a client accessing a target service according to the prior art and the preferred embodiment of the present invention respectively. Note that the examples consider a simple target service which is a Time service with a single operation. This is for illustrative purposes only and in practice the target services are likely to be more complex. Further note that the preferred embodiment is described in terms of the target service providing a description of its interface and bindings in a WSDL document. However in practice this could be achieved in any document format which can be read and understood by a client and could, for example be XML. Further the WSDL document is made available via a UDDI directory. However in practice this could be via any source known to both the target service and client and which enables the required exchange of information. It could, for example, be a Naming or Directory service.

Further note that a WSDL document contains details of the target service such as Port Type, Bindings, Ports, Messages, Types etc. The Port Type defines the operation and operation parameters provided by the target service, the Bindings specify the transport mechanisms, and the Port specifies the end point addresses for channels providing access to the target service using the transport mechanisms. For the purposes of the preferred embodiment only the Port Type, transport mechanism specified in the Bindings, and end point address specified in the Port are considered.

FIG. 2 is a schematic diagram showing an example of a client accessing a target service according to the prior art. The figure shows a Time service (201) which is available at a target server (200). The target server has a channel (202) which supports communication using a transport mechanism of SOAP over HTTP. The Time service is described in a WSDL document (203) which specifies a Port Type of Time( ) (203a) and binding for the channel which specifies a transport mechanism of SOAP/HTTP (203b) and a Port which specifies an end point address of http:/www.time.com/soap-.Time (203c). The server registers (205) the Time service with a known UDDI directory (250) by providing the type of the service and a URL of http://www.time.com/Time.wsdl (204) from which a client can obtain a copy of the WSDL. The UDDI directory may be known to the gateway, for example, through configuration information.

A first client process (211) is running an application (212) which wishes to access the Time service. The client process includes a channel (213) which provides a transport mechanism of SOAP over HTTP. The application first accesses (214) the UDDI directory (250) to obtain details of a Time service and in return receives details of the Time service URL (http://www.time.com/time.wsdl) (204). The client application then accesses (215) the URL in order to obtain the WSDL document (203) describing the service. Based on this document the application requests (216) the Time( ) operation of the Time service as specified in the Port Type (203a) of the WSDL document using a transport mechanism of SOAP/HTTP as specified the bindings (202b) of the WSDL document, and directing the request to the end point address specified in the Port (203c) of the WSDL document. The request (216) is received by the SOAP/HTTP channel (202) in the target server (200) and passed (206) to the Time service (201).

Also, a second client process (221) is running an application (222) which wishes to access the time service. However the client only includes a channel (223) which provides a transport mechanism of SOAP over JMS (Java Message Service, Java is a registered trade mark of Sun Microsystems Inc.). The application accesses (224) the UDDI directory (250) and obtains (225) the Time service WSDL document (203) in the same way as the first client process. However, the second client cannot request (226) the Time( ) operation because it does not include channel a which provides a transport mechanism of SOAP over HTTP.

FIG. 3 is a schematic diagram of a gateway (300) according to the preferred embodiment of the present invention. The figure shows the same Time service (201) as FIG. 2, but in this figure the Time Service WSDL-WSDL1 (202) is provided (311) to the gateway server. The gateway then removes the bindings in WSDL1 to produce WSDL2 (301). WSDL2 is then provided (312) to the SOAP/JMS channel (302) in the gateway server. The channel includes extra logic (303) which adds a binding which specifies the transport mechanism provided by the channel to WSDL2 and a port which specifies an end point address for the channel, thereby producing (313) WSDL3 (304). WSDL3 is then provided (314) to the SOAP/HTTP channel (305) which also includes extra logic (306). This extra logic adds a binding which specifies the transport mechanism provided by this channel to WSDL3 (304) and a port which specifies an end point address for this channel, thereby producing (315) WSDL4 (307). The gateway then publishes the existence of WSDL4 by registering (316) the Time service with one or more known UDDI directories, although the figure shows a single UDDI registry (250). The information provided to the UDDI directory comprises the type of the service and a URL of http://www.gateway.com/WSDL?WSDL4 of a servlet from which a client can obtain a copy of WSDL4.

Now when the application (222) in the second client process (221) (also shown in FIG. 2) accesses (224) the public UDDI registry (250) to locate the Time Service and obtains (317) the Time service (WSDL) it is provided with WSDL4 (307). WSDL4 includes details of a SOAP/JMS transport mechanism in the gateway and an associated end point address. As a result the second client application can issue a request (318) to the time service at the end point address using the channel (223) which provides the SOAP/JMS transport mechanism in the second client process (221). The request (318) is received by the SOAP/JMS channel (302) in the gateway (300). The request is the converted and passed (319) to a SOAP/HTTP channel (309) for forwarding (320) to Time service (201) via the SOAP/HTTP channel (203) in server (200). Note that in another embodiment the two SOAP/HTTP channels (305 and 309) may be provided as a single channel.

As a result according to the preferred embodiment of the present invention the second client process (221) can access the Time service (201) in server 200 even though the client and target service do not support the same transport mechanisms. Further in this embodiment, from the clients perspective the Time service is provided by gateway (300).

Note that in the preferred embodiment the modified WSDL (WSLD4 (307) of FIG. 3) is not provided to the UDDI directory, although in another embodiment it could be provided. However by providing a location of a servlet from which the WSDL can be retrieved it is possible for the gateway server to dynamically generate the modified WSDL definition, when requested by a client. As a result, for example, if new channels are added to the gateway, or a new target service WSDL is imported to the gateway, a client will be returned an up to date WSDL including the new binding and/or port type.

Note in other embodiments the gateway server may support many more and different combination of channels, for example RMI over IIOP, XML over JMS, SOAP over SMTP. Also note that the combination of channels for which transport mechanism and end point address are added to the target service WSDL may be selected according to predetermined criteria when the target service WSDL is imported into the gateway. For example, it is not necessary for all channels to be used for every service.

Further note that in the preferred embodiment the Time service WSDL (WSDL1) is provided to the gateway (300) by server (200), however in other embodiments the gateway can know of WSDL1, for example, based on configuration information (for example containing either the URL location of the WSDL file or UDDI lookup information). As a result, in this embodiment the Gateway should import the WSDL documents and use them to generate a new (modified) WSDL documents which may then be published to one or more UDDI directories.

The generation of the modified WSDL document involves rebinding the imported definition. That is, removing the Port Type from the imported definition, then using the defined Channels for the gateway service to add Channel-specific binding and port information corresponding to the transport mechanism and end point address supported by the channel.

Further note that in the preferred embodiment the gateway server removes the target service binding from WSDL (202) to produce WSDL2 (301). As a result WSDL4 (307), as published by the gateway, includes only details of bindings to the gateway server channels. This means that clients can only access the Time service (201) via the gateway server (300) even if the client and the Time Service can use the same transport mechanisms. For example, considering FIG. 2, where the first client process (211) could access the Time Service directly (from the SOAP/HTTP channel (213) in the client to the SOAP/HTTP channel (202) in server (200)) in the prior art, this in now preferably done via the gateway server. However in another embodiment the gateway server may leave the time service bindings (203b) in WSDL4 to enable direct communication between the client and target service where it is possible.

FIGS. 4 to 8 are flow diagrams showing various embodiments of methods followed by a gateway. FIG. 4 shows a method followed by the gateway server when generating a modified WSDL document for a target service. At step 401 the target service WSDL documents is accessed. The document, for example, may be been provided by the server in which the target service resides or may have been obtained by the gateway based on configuration information. The bindings and port specified by the target service are then removed from the WSDL document at step 402, although this step is optional. At step 403, step 404 is called for each of one or more channels. Step 404 involves adding bindings and port for the relevant channel to the WSDL, the binding including the transport mechanism. Once step 404 has been completed for the one or more channels the modification of the WSDL is complete.

FIGS. 5 to 7 show various embodiments in which the method of FIG. 4 may be used. In FIG. 5 at step 501 a client request is received at the gateway for a copy of the target service WSDL. This triggers the gateway to employ the method of FIG. 4 thereby dynamically generating the modified WSDL. Optionally the channels for which details are added to the modified document can be selected based on information received from the client as part of the request. Once the modified WSDL has been generated it is returned to the client at step 502.

In FIG. 6 at step 601 the gateway imports a WSDL document for a target service. Importing can involve, for example, retrieving the WSDL based on configuration, information, or receiving the WSDL from a server in which the target service resides. The gateway then, optionally, employs the method of FIG. 4 to generate the modified WSDL for subsequent provision on request to a client. Note that this is optional because the gateway may defer generation of the modified WSDL to when it is requested by a client, as shown in FIG. 5. At step 602 the UDDI directory is provided with a location, such as a servlet, from which a modified WSDL for the target service can be requested.

In FIG. 7 at step 701 the gateway imports a WSDL document for a target service as per step 601 of FIG. 6. The gateway then employs the method of FIG. 4 to generate the modified WSDL before, at step 702, providing the modified WSDL to the UDDI directory for subsequent retrieval by a client.

FIG. 8 shows the method followed by the gateway when receiving a request from a client for a target service for which the gateway previously provided a modified WSDL. At step 801 the client request is received on a first channel which provides a transport mechanism which is not supported by the target service. At step 802 the request is modified to a format suitable for a second channel which provides a transport mechanism that is supported by the target service. Finally at step 803 the request is forward to the target service via the second channel.

Note that FIG. 8 only describes client to target service communication. However, to should be clear to the skilled person that flows in the opposite direction will follow the opposite path.

Further the client may wish to provide to the target service its own WSDL. This can be achieved, for example, by the client service providing its WSDL to the gateway and providing to the target service the location in the gateway from which the target service can receive the WSDL. Alternatively for example the target service can go to the UDDI directory effectively reversing the roles of the client and target service in the embodiments described.

Thus the primary function of the Gateway of the preferred embodiment is to map an existing WSDL—defined web service (target service) to a new web service which then appears to be provided by the Gateway (gateway service). A gateway service is configured to have a number of channels, target services and UDDI references. A gateway service is considered active if it has at least one channel and target service defined for it. Without a channel the gateway service cannot be invoked, and without a target service the gateway service has no destination for requests.

Thus the preferred embodiment of present invention provides a web service gateway which enables a web client to access a target service which does not provide a transport mechanism with which the client can communicate. The gateway imports a target service document describing the target service interface, end point addresses and supported transport mechanisms, and then modifies it by adding end point addresses and transport mechanisms supported by the gateway. A client may then access the target service by obtaining the modified document and sending a request to a gateway provided end point address using the associated transport mechanism. The gateway then forwards the request to the target service by converting the request and forwarding it to an end point address and transport mechanism specified in the target service document.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method for accessing a target service in a target server comprising:
   receiving a request to access to the target service via a gateway server, the gateway server having a plurality of channels each of said channels providing a client access to said gateway server at an end point address using at least one transport mechanism, said providing access including the steps:
   providing a first document describing said target service, said first document including details of the at least one transport mechanism and the end point address for accessing said target service;
   creating a modified document by adding details comprising the at least one transport mechanism and end point address for at least one of said plurality of channels to said first document, said modified document including no modification on a port type in the first document, said port type representing an operation and operation parameters provided by said target service; and
   making said modified document available to a client;
   thereby enabling said client to access said target service via said gateway using one of said channels for which details were added to said modified document, wherein said client accessing said target service when said client and said target service support different transport mechanisms.

2. The method of claim 1 comprising the further step of:
   removing details of the at least one transport mechanism and the end point address from the modified document.

3. The method of claim 1 wherein the step of making the modified document available to a client comprises the step:
   publishing in a source available to said client a location from which said modified document can be obtained.

4. The method of claim 1 wherein the step of making the modified document available to a client comprises the step:
   publishing the modified document in a source available to said client.

5. The method of claim 3 comprising the further steps of:
   receiving a request from said client for a document describing said target service; and
   returning said modified document in response to said request from said client;
   wherein the step of creating a modified document is in response to receiving said request from said client for a document describing said target service.

6. The method of claim 1 wherein the step of accessing a first document comprises obtaining said first document from a location contained in configuration information of said gateway.

7. The method of claim 1 wherein the step of accessing a first document comprises receiving said first document from a data processing host.

8. The method of claim 1 comprising the further steps of:
   receiving a request for the target service from the client via a channel provided transport mechanism;
   converting the request from the channel provided transport mechanism to a target service transport mechanism; and
   providing the request to the target service via the target service transport mechanism.

9. The method of claim 1 wherein said first and modified documents are defined using the Web Service Definition Language (WSDL).

10. The method according to claim 1, wherein said at least one transport mechanism is one or more of: SOAP (Simple Object Access Protocol) over JMS (Java Message Service), RMI (Java Remote Method Invocation) over IIOP (Internet Inter-ORB Protocol), XML over JMS and SOAP over SMTP (Simple Mail Transfer Protocol).

11. The method according to claim 1, wherein said end point address is described in the first document as a URL (Uniform Resource Locator) corresponding to said at least one transport mechanism.

12. A gateway apparatus for accessing a target service in a target server comprising:
   a gateway server to receive a request to access to the target service, said gateway server comprising a plurality of channels each of said channels providing access to said gateway server at an end point address using at least one transport mechanism, the gateway server including:
   means for providing a client with information for accessing said target service via one of said channels, in response to a client request, said providing means providing a first document describing said target service, said first document including details of the at least one transport mechanism and the end point address for said target service;
   means for creating a modified document by adding details comprising the at least one transport mechanism and the end point address for at least one of said plurality of channels to said first document, said modified document including no modification on a port type in the first document, said port type representing an operation and operation parameters provided by said target service;
   means for making said modified document available to a client,
   thereby said client enables to access said target service via said gateway using one of said channels for which details were added to said modified document, wherein said client accessing said target service when said client and said target service support different transport mechanisms.

13. The gateway apparatus of claim 12 further comprising:
   means for removing details of the at least one transport mechanism and the end point address from the modified document.

14. The gateway apparatus of claim 12 wherein the means for making the modified document available to a client comprises:
   means for publishing in a source available to said client a location from which said modified document can be obtained.

15. The gateway apparatus of claim 12 wherein the means for making the modified document available to a client comprises:
   means for publishing the modified document in a source available to said client.

16. The gateway apparatus of claim 14 further comprising:
   means for receiving a request from said client for a document describing said target service; and
   means for returning said modified document in response to said request from said client;
   wherein the means for creating a modified document is responsive to receiving said request from said client for a document describing said target service.

17. The gateway apparatus of claim 12 wherein the means for accessing a first document comprises:
   means for obtaining said first document from a location contained in configuration information of said gateway.

18. The gateway apparatus of claim 12 wherein the means for accessing a first document comprises:
   means for receiving said first document from a data processing host.

19. The gateway apparatus of claim 12 further comprising:
   means for receiving a request for the target service from the client via a channel provided transport mechanism;
   means for converting the request from the channel provided transport mechanism to a target service transport mechanism; and
   means for providing the request to the target service via the target service transport mechanism.

20. A gateway apparatus of claim 12 wherein said first and modified documents are defined using the Web Service Definition Language (WSDL).

21. The gateway apparatus according to claim 12, wherein said at least one transport mechanism is one or more of: SOAP (Simple Object Access Protocol) over JMS (Java Message Service), RMI (Java Remote Method Invocation) over IIOP (Internet Inter-ORB Protocol), XML over JMS and SOAP over SMTP (Simple Mail Transfer Protocol).

22. The gateway apparatus according to claim 12, wherein said end point address is described in the first document as a URL (Uniform Resource Locator) corresponding to said at least one transport mechanism.

23. A computer program product comprising a computer usable medium having computer readable program code means embodied therein for causing a gateway to provide access to a target service, the computer readable program code means in said computer program product comprising computer readable program code means for causing a computer to effect the functions of claim 12.

24. An article of manufacture comprising a computer usable medium having computer readable program code means embodied therein for causing a gateway to provide access to a target service, the computer readable program code means in said article of manufacture comprising computer readable program code means for causing a computer to effect the steps of claim 1.

25. A program storage device readable by machine, tangibly embodying a program of instructions executable by the machine to perform method steps for a gateway to provide access to a target service, said method steps comprising the steps of claim 1.

* * * * *